C. FRANZ.
HOT PLATE.
APPLICATION FILED DEC. 16, 1914.

1,168,875.

Patented Jan. 18, 1916.

Witnesses
B. M. Hartman

Inventor
Conrad Franz
By
Attorneys.

UNITED STATES PATENT OFFICE.

CONRAD FRANZ, OF ERIE, PENNSYLVANIA, ASSIGNOR TO GERMER STOVE COMPANY, OF ERIE, PENNSYLVANIA, A CORPORATION OF PENNSYLVANIA.

HOT-PLATE.

1,168,875.  Specification of Letters Patent.  Patented Jan. 18, 1916.

Application filed December 16, 1914. Serial No. 877,515.

*To all whom it may concern:*

Be it known that I, CONRAD FRANZ, a citizen of the United States, residing at Erie, in the county of Erie and State of Pennsylvania, have invented new and useful Improvements in Hot-Plates, of which the following is a specification.

This invention relates to hot plates and consists in certain improvements in the construction thereof as will be hereinafter fully described and pointed out in the claims.

It is desirable to provide the burners of hot plates with protecting rings to protect the burners from drafts.

The object of this invention is to simplify the method of supporting these rings.

The invention is illustrated in the accompanying drawings as follows:—

Figure 1:
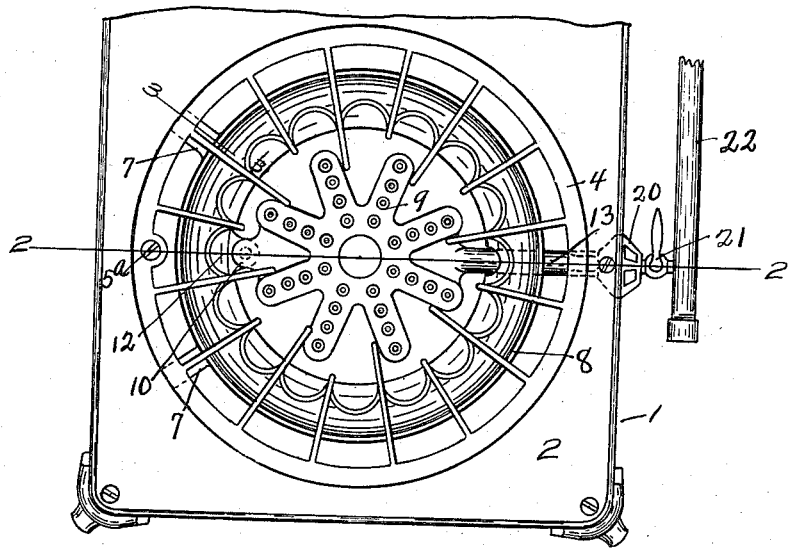
Figure 2:
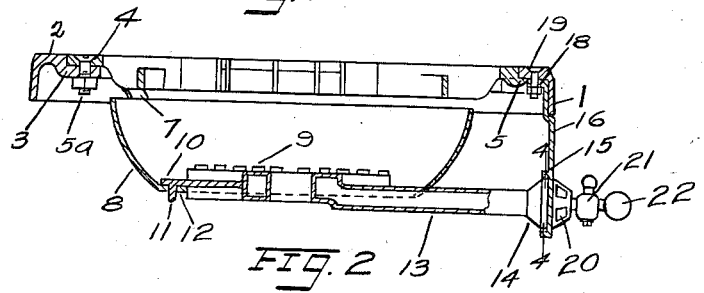
Figure 3:
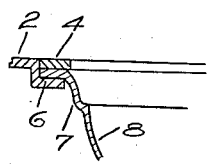
Figure 4:
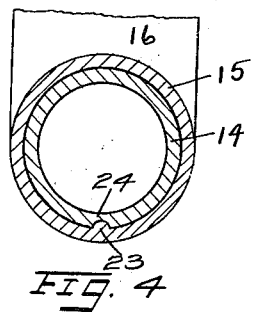
Figure 5:
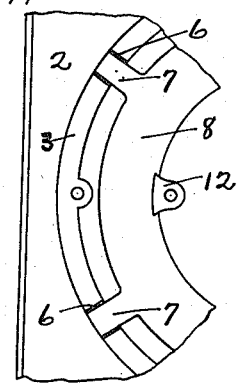

Figure 1 shows a plan view of a part of a hot plate extending over the burner. Fig. 2 a section on the line 2—2 in Fig. 1. Fig. 3 a section on the line 3—3 in Fig. 1. Fig. 4 a section on the line 4—4 in Fig. 2. Fig. 5 a plan view of a fragment of the hot plate with the grate removed.

1 marks the plate frame, 2 the top plate of the hot plate, 3 an annular lip for supporting grate, the lip being slightly depressed from the surface of the plate 2 so that the surface of the grate may be flush with the plate.

4 marks the grate. This is provided with the lip 5 at one side which hooks under the edge of the plate 2 and is secured at the opposite side by the bolt 5ª which extends through the lip 3. Two pockets 6 are arranged in the lip 3. These are simply depressions in the lip and the arms 7 extending from the protecting ring 8 project into these pockets, the pockets being deep enough to receive the arms 7 with the grate in place. The burner 9 has the mixing tube 13 extending laterally from it and is provided at the side opposite the mixing tube with a projecting lug 10 having a pin projection 11 which extends through a lug 12 extending inwardly from the ring 8. This connection through the lugs 10 and 12 forms a support for the burner at the side opposite the mixing tube. The mixing tube terminates in a part of the mixer 14 and this is placed in the ring 15 arranged on the mixer plate 16. The mixer plate 16 has an angle 18 at the top secured to the top plate by a bolt 19. The part 14 of the mixer is supplemented by the mixer ring 20 on the outside of the plate 16 and the valve connection 21 extends to the gas pipe 22. In order to maintain the burner in a horizontal position the ring 15 is provided with a small key lug 23 which extends into a slot 24 in the part 14 of the mixer.

It will be observed that when these parts are assembled the protecting ring 8 is supported at one side by the arm 7 and that the opposite side of this ring rests on the mixing tube 13 and the burner is supported by the connection formed by the lugs 10 and 12 and by the mixing tube which extends into the ring 15. The result is that while these parts can be readily assembled and readily detached when desired they are so interlocked that they form a comparatively rigid structure when in use so that when the hot plate is moved from place to place there is no disturbance of the relation between the burner and protecting ring. At the same time the assembling of these parts is very simple yet very efficient.

What I claim as new is:—

1. In a hot plate, the combination of a top plate; a burner below the top plate; a mixer tube extending laterally from the burner; a protecting ring around the burner supported on one side on the mixer tube and at the opposite side by the top plate; a connection between the burner and the protecting ring at the side opposite the mixer tube; and means for supporting the mixer tube outside the protecting ring.

2. In a hot plate, the combination of a frame comprising a top plate; a burner below the top plate; a mixing tube extending laterally from the burner; a protecting ring around the burner supported on one side on the mixing tube and at the opposite side by the top plate; a connection between the burner and the protecting ring at the side opposite the mixing tube; and a connection between the mixing tube and the frame comprising means for locking the mixing tube against rotation.

In testimony whereof I have hereunto set my hand in the presence of two subscribing witnesses.

CONRAD FRANZ.

Witnesses:
H. C. LORD,
B. M. HARTMAN.